United States Patent

[11] 3,525,329

| [72] | Inventors | Harry S. Zeimer<br>Jerusalem, Israel<br>Ariel Simkin, Jerusalem, Israel |
|---|---|---|
| [21] | Appl. No. | 556,768 |
| [22] | Filed | June 10, 1966<br>Continuation-in-part of Ser. No. 474,404,<br>July 23, 1965, abandoned. |
| [45] | Patented | Aug. 25, 1970 |
| [73] | Assignee | Prime Minister's Office of the State of<br>Israel, Jerusalem, Israel |
| [32] | Priority | June 16, 1965 |
| [33] | | Israel |
| [31] | | No. 23743 |

[54] EVERTABLE, EXTENDIBLE PROBE
11 Claims, 17 Drawing Figs.

[52] U.S. Cl. .................................................. 128/2,
128/262
[51] Int. Cl. .................................................. A61b 1/00,
A61b 5/00
[50] Field of Search .......................................... 128/262.2;
156/287, 294

[56] References Cited
UNITED STATES PATENTS

| 3,433,214 | 3/1969 | Silverman | 128/2 |
|---|---|---|---|
| 2,794,758 | 6/1957 | Harper et al | 154/82 |
| 3,168,092 | 2/1965 | Silverman | 128/262X |
| 3,178,732 | 4/1965 | Stibitz | 5/81 |
| 3,230,129 | 1/1966 | Kelly | 156/287 |

Primary Examiner— Dalton L. Truluck
Attorney— Karl F. Ross

ABSTRACT: The specification describes a probe that may be used by a physician to explore body cavities. The probe may be a long, inwardly folded flexible tube, the ends of which are secured to the rim of an annular fitting adapted to be sealingly fitted to a fluid pressure distribution device, provided with fluid inlet and outlet ports. Fluid admitted to the pressure distribution device will enter the flexible probe and extend it into the body cavity to be examined.

Patented Aug. 25, 1970

3,525,329

INVENTORS:
HARRY S. ZEIMER
ARIEL SIMKIN
BY Robert W. Kell
ATTORNEY

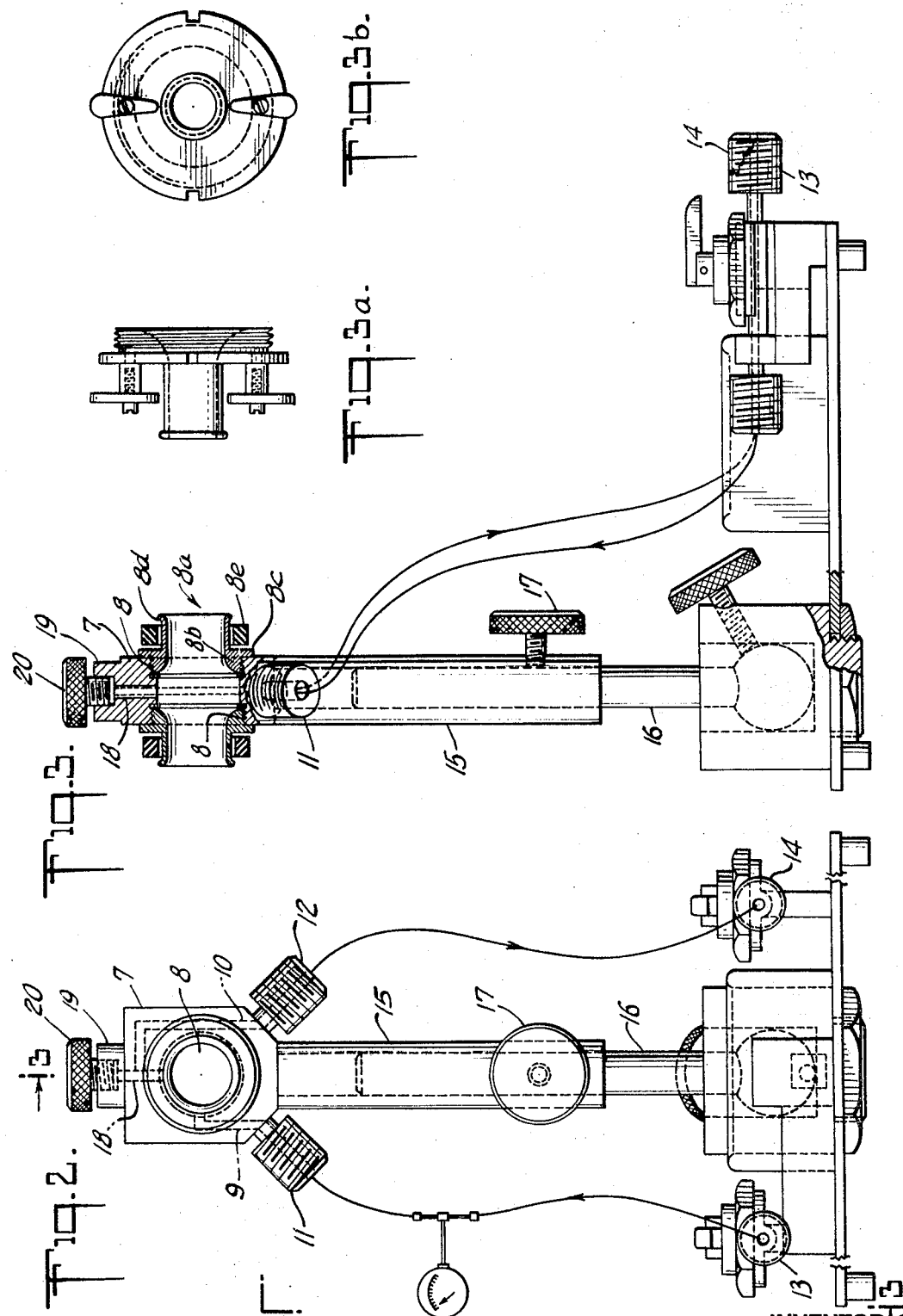

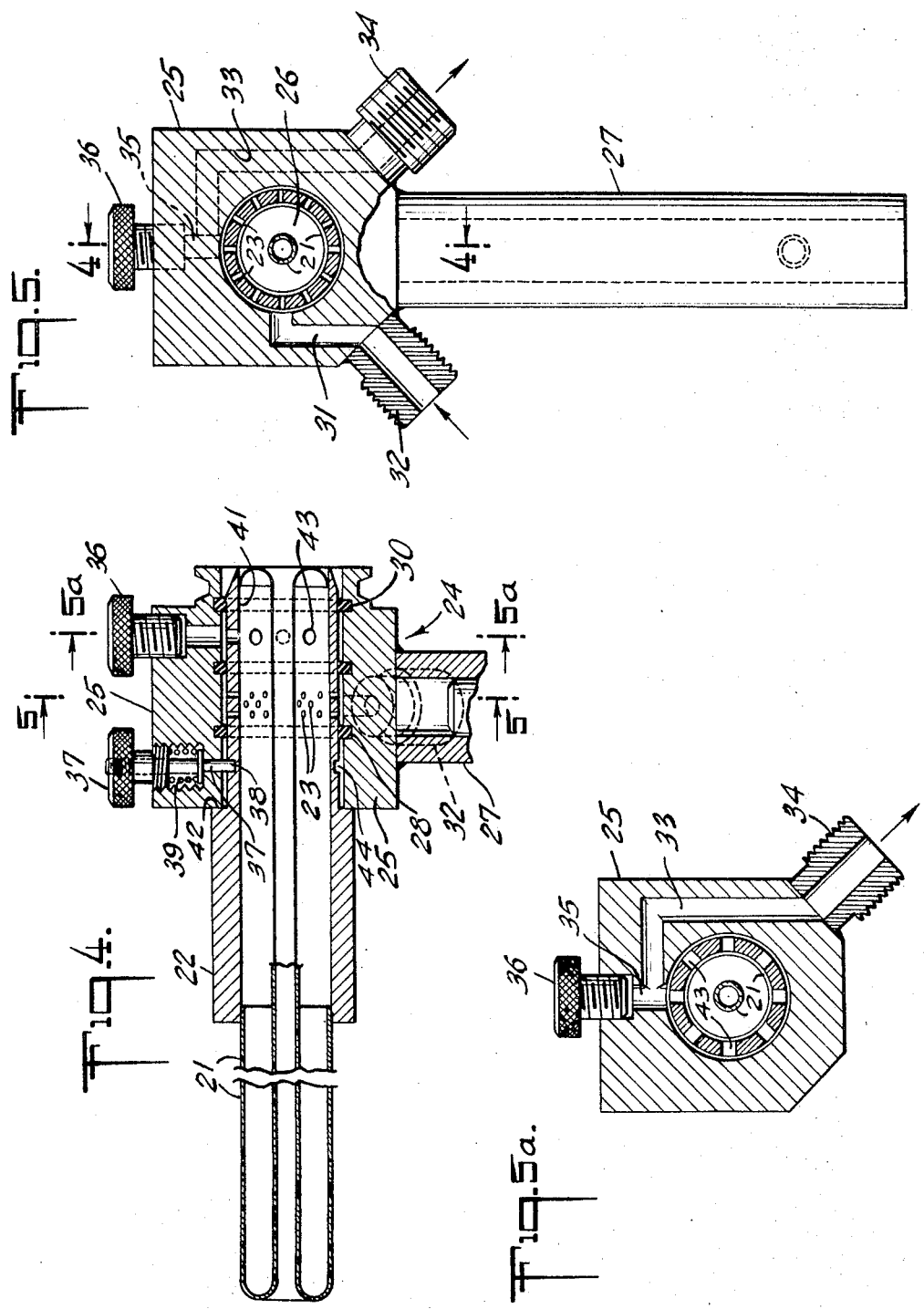

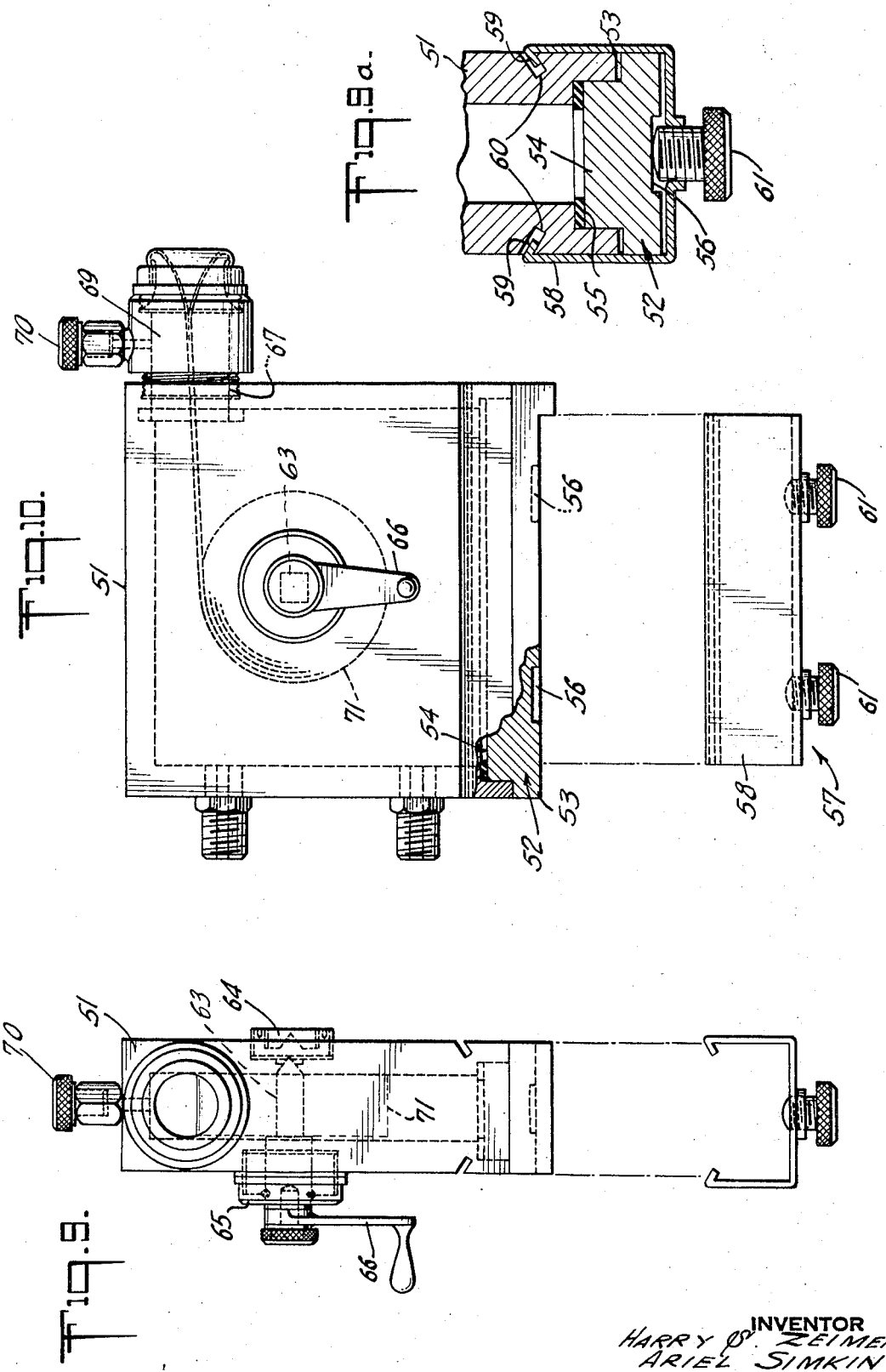

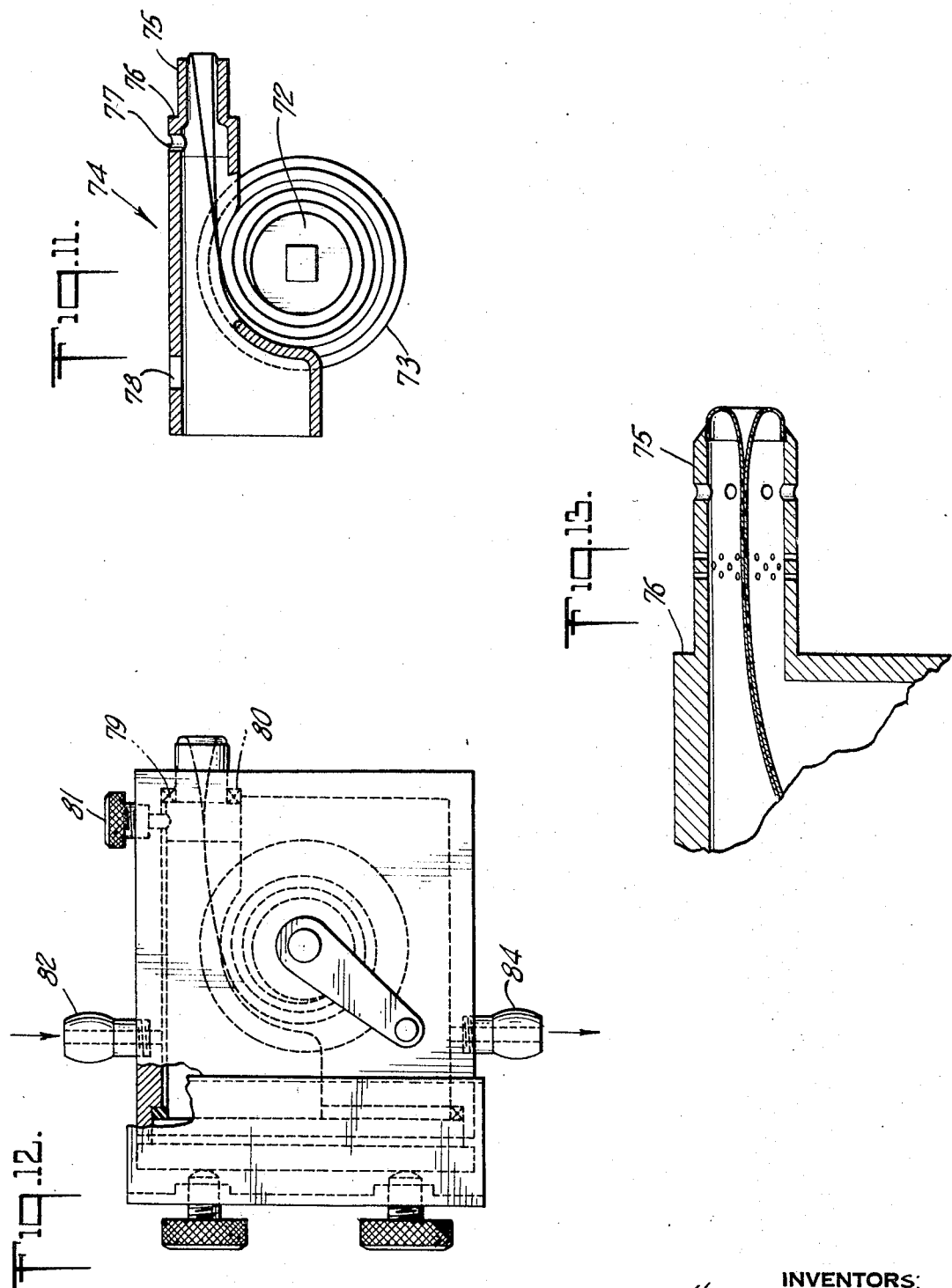

EVERTABLE, EXTENDIBLE PROBE

This invention relates to extendible probes and is a continuation-in-part of our co-pending U.S. Pat. Application Ser. No. 474,404; filed July 23, 1965, now abandoned. In this co-pending patent application, there has been described an extendible probe formed of a flexible envelope which can be extended or retracted utilizing respectively the phenomena of extroversion and introversion as these terms have been defined in the co-pending application. Such a probe can be introduced into a cavity or tract, for example, a body cavity or tract substantially avoiding sliding friction.

The present application deals with further developments of such probes hereinafter referred to as "probes of the kind specified".

For medical use, the probes require preparation assembly and cleaning after use. Where the probes have the form of relatively long, inwardly folded, film-like tubes frequently made of regenerated cellulose, collagen, or the like, all this requires the expenditure of considerable time and skill. Unskilled handling of the probes can lead to tearing of the probe and/or the formation of kinks or other obstructions especially when it is a question of introduction into body tracts or cavities which are at least 70 cms. in length.

Particularly, when the probes are designed for use in gastroenterological procedures and in view of the difficulties of post-use cleaning, it is desirable that the probes be disposable after a single use. Furthermore, it is highly desirable that the preparation and assembly of the probe be rendered as simple as possible.

The present application is in particular concerned with the provision of probes of the kind specified with pressure-fluid-distribution devices by means of which the probes can be extended and with probes specially adapted for use with such devices. Equally, the present application is particularly concerned with the provision of dispensing devices for probes of the kind specified.

According to one aspect of the present invention, there is provided a pressure fluid distribution device comprising a probe holder to which at least one turned-over probe end is adapted to be sealingly fitted, said device being formed with fluid communication means whereby fluid can be supplied to and withdrawn from the probe.

Preferably, said device comprises a distribution body which is apertured to receive and to be sealingly fitted to a probe cartridge, said body having formed therein inlet and outlet ducts adapted to communicate with the interior of the probe and provided with inlet and outlet ports.

According to a further aspect of the present invention, there is provided a probe cartridge for use with a distributor device as defined above, said cartridge comprising a tubular endpiece and a compacted flexible tube, the turned-over ends of which are secured to the rims of the endpiece, said endpiece being adapted to allow for fluid communication with the interior of the probe.

According to a still further aspect of the present invention, there is provided a probe dispenser unit comprising a box in which a probe-cartridge reel can be rotatably accommodated, means for rotating said cartridge reel, a probe outlet of said box adapted to accommodate a probe adapter unit to which the turned-over end of the probe can be secured, fluid inlet and outlet ports of the box and box-sealing means.

And according to a still further aspect of the present invention, there is provided a probe cartridge for use with the probe dispenser unit just defined and comprising a reel upon which is coiled the probe tubing, and, articulated to said reel and rotatable about the axis thereof, a tubular outlet piece to which the turned-over end of the probe is adapted to be fitted.

The various embodiments of probes, fluid distributor devices, and probe dispenser units in accordance with the present invention will now be described by way of examples and with reference to the accompanying drawing in which:

FIGS. 2 and 3 are front and side elevations (the latter partly in section along line 3—3 of FIG. 2); respectively of a second fluid-distributing device;

FIGS. 3a and 3b are side elevational and end views, respectively, of probe adaptors.

FIG. 4 is a longitudinal sectional view (along line 4—4 of FIG. 5) of a third fluid-distributing device to which is fitted a probe cartridge;

FIG. 5 is a cross-sectional view of the device shown in FIG. 4 taken along the lines 5—5;

FIG. 5a is a section along line 5a—5a of FIG. 4;

Figure 6:
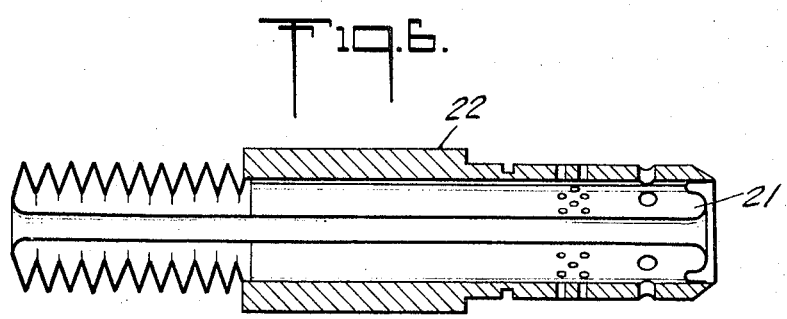
Figure 7:
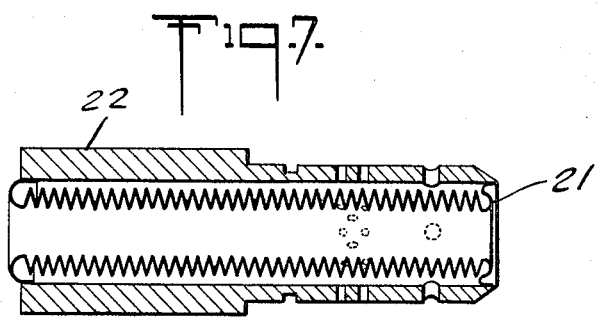
Figure 8:
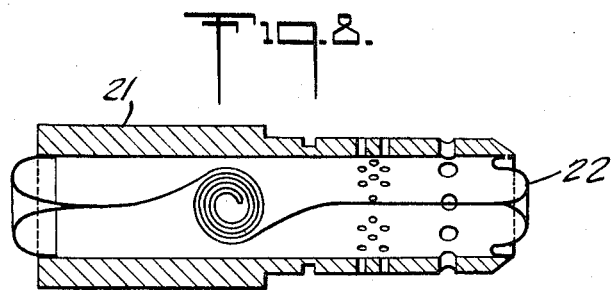

FIGS. 6, 7, and 8 are longitudinal sectional views of three differing kinds of probe cartridges for use with the device shown in FIGS. 4 and 5;

FIGS. 9 and 10 are side and front elevations (the latter partly broken away) of disassembled probe dispensers;

FIG. 9a is a detail view in cross section;

FIG. 11 is a sectional side elevation of a probe cartridge;

FIG. 12 shows the probe cartridge shown in FIG. 11 fitted in a probe dispenser; and FIG. 13 shows the modification of the nose of the cartridge shown in FIG. 11, or that of the probe dispenser shown in FIGS. 11 and 12 to render them suitable for use with the distributor device shown in FIGS. 4 and 5.

Figure 1:
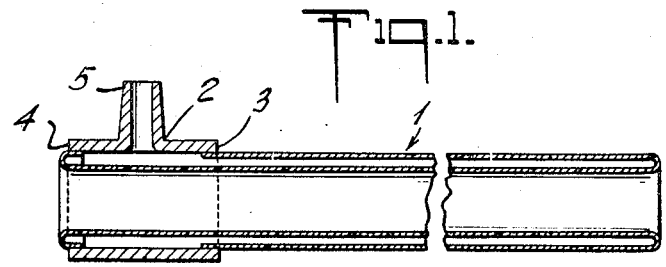
FIG. 1 is a longtudinal sectional view of a first form of fluid-distributing device and associated probe.

Reference will now be made to FIG. 1 of the drawings which illustrates in a schematic form a two-ended probe 1 in accordance with the invention as fitted to a T-shaped fluid distributor device 2. As seen in the drawing, a flexible probe has its ends turned back and secured respectively to the rims 3 and 4 of the horizontal limb of the T-shaped distributor device 2. If now fluid is introduced into the distributor through the vertical inlet 5, the probe will become inflated under pressure and the fluid inlet is sealed. By pushing a cylindrical object into the central core of one end of the probe, the increased pressure created in the probe causes the extroversion of the probe and the other end of the probe is caused to advance as required into a cavity or tract until the head of the cylindrical object emerges. This cylindrical object can be constituted by an instrument which is to be introduced into the tract by the probe. The instrument, such as a Fiberscope or a biopsy tube, can thus be introduced into the body cavity without frictional rubbing on the cavity wall. Where the purpose of introducing the instrument is to inspect visually or to record photographically the cavity, the probe can be made of a substantially transparent material in which case the instrument can "see" the cavity wall even before emerging from the advancing end of the probe.

FIGS. 2 and 3 illustrate a specific form of distributor device for use with the type of probe just described. This device comprises a main body 7 with a throughgoing aperture 8, which is tapped at both ends so as to facilitate the connection of probe adapters 8a (only one being shown in FIG. 3) of varying diameters to either end of the body 7 to which adapters the turned-over ends of the flexible probe (not shown) are to be secured. The body 7 is furthermore formed with a pair of ducts 9 and 10; the inner ends of which communicate with the interior of the aperture 8, and the outer ends of which communicate with inlet and outlet ports 11 and 12 which can, if desired, be coupled via flexible tubing, etc., to inlet and outlet valves 13 and 14, the inlet valve 13 being coupled to a fluid supply source, whilst the outlet valve 14 being coupled to a sink or to the outer atmosphere. The body 7 is formed integrally with a supporting limb 15, which is designed to slide on a support rod 16 and can be fixed in position with respect to the support rod 16 by means of a clamping screw 17.

The body 7 is provided with a further duct 18 communicating with the interior of the aperture 8 and which communicates with an auxiliary inlet port 19 adapted to be sealed by a screw cap 20. Communication between the inlet valve 13 and the inlet port 11 can be by way of a pressure gauge. The whole device is mounted on a support plate which can be used if desired, to support auxiliary equipment. The whole arrangement is so designed that the distributor can be readily oriented in direction and in height.

The probe adapters 8a to be screwed into the tapped apertures 8 each comprise an externally threaded skirt 8b formed integrally with an annular disc 8c in its turn formed integrally with tubular extension 8d. Adapters having tubular extensions of differing diameters can be employed to accommodate probes of differing diameters.

In use, a flexible probe (not shown) is threaded through the central aperture 8 in the body 7, and both ends of this probe are turned over and fixed to the tubular extensions 8d of the probe adapters 8a, which have been previously fixed in position on either side of the central aperture 8 of the body 7. The turned-over ends can be fixed to these extensions 8d by rubber rings 8e. A fluid is then introduced into the closed envelope of the probe via the inlet valve 13 and inlet port 11, the outlet port 12 and valve 14 being maintained open until all air has been expelled. With the expulsion of air, the outlet valve 14 is closed, and the fluid pressure in the probe is raised up until the probe is fully expanded and extended, generally to one side of the distributor. If now it is desired to extend the other end of the probe into, for example, a body cavity or the like, a cylindrical object is inserted into the central core of the extended probe end, thereby causing the extroversion of the other end into the cavity.

The auxiliary inlet 19 in the distributor body can be used to introduce into the probe an auxiliary fluid, for example, an X-ray contrast fluid. When not in use, this auxiliary inlet 19 is sealed by means of the screw cap 20.

A modified arrangement of a probe and fluid distributor is illustrated in FIGS. 4 and 5 of the drawings. As can be seen from FIG. 4, the probe which can advantageously be a disposable probe is constituted by a flexible tube 21, whose ends are turned over and secured to a tubular endpiece 22. This endpiece 22 is provided with a set of circumferential apertures 23 by means of which communication can be had with the inside of the probe. The associated probe fluid distributor device 24 comprises a main body 25, having a throughgoing aperture 26 and is supported on a support rod 27. Set into the aperture wall of the distributor body 25 and spaced axially apart are three sealing rings 28, 29, and 30. Formed in the distributor body 25 is an inlet duct 31 communicating at one end with an inlet port 32 and at the other end with the main aperture 26 and an outlet duct 33 communicating at one end with an outlet port 34 and at the other end with an auxiliary duct 35, which in its turn communicates with the main aperture 26. The auxiliary duct 35 is adapted to be sealed when not in use by a screw cap 36. A spring loaded locating pin 37 is located in the distributor body 25, the tip 38 of the pin 37 projecting downwardly out of the body 25 into the throughgoing aperture 26. A spring 39 presses the locating pin 37 downwardly, but the pin 39 can be raised against its spring biasing.

The probe endpiece 22, which is designed to be inserted into the throughgoing aperture 26 of the distributor body 25, is formed with an end portion 41 of reduced diameter bounded by a shoulder 42 designed to fit against the outer wall of the distributor body 25. The set of peripheral apertures 23 of the endpiece are designed to communicate with the inlet duct 31 and to be located between the sealing rings 28 and 29 whilst a further set of peripheral apertures 43 is adapted to communicate with the outlet duct and to be located between the sealing rings 29 and 30. The endpiece 22 is furthermore provided adjacent its shoulder with a peripheral groove 44 in which is adapted to engage the tip 38 of the locating pin 37.

In use, a probe which can take the form of any of a number of different pre-packed cartridges, to be described below, has its endpiece 22 inserted in a throughgoing aperture 26 of the distributor body 25, and when the tip 38 of the locating pin 37 engages the locating groove 44 of the endpiece 22, it is ensured that the various sets of apertures of the probe endpiece are correctly aligned with the corresponding ducts of the distributor body. The inlet port 32 of the distributor body is connected to a source of fluid supply whilst the outlet port 34 is connected to a sink or to the outer atmosphere both these connections being suitably made through appropriate valves (not shown). When it is desired to operate the probe, the procedure described above for filling the probe with the fluid under pressure is followed, and as a result, the probe is advanced from the end of the distributor body in the desired direction and into any desired cavity or tract. The distribution body auxiliary duct 35, which can normally be sealed by the screw cap 36, can be used for the introduction of an auxiliary fluid, such as for example an X-ray contrast medium. The provision of the locating pin 37 ensures that the probe can be inserted into the distribution body in any angular position, and by virtue of the fact that the inlet apertures are distributed around the periphery of the probe, communication is readily effected between the various inlet and outlet ducts and the corresponding apertures in the probe.

Reference will now be made to FIGS. 6, 7, and 8 which will illustrate three alternative embodiments of disposable probe cartridges for use with a distributor shown in FIGS. 4 and 5 of the drawings. In each case, the cartridge includes a rigid endpiece 22 described previously with reference to FIG. 4. As seen in FIG. 6, the front end of the flexible tube 21 is bent over and secured by bonding to the front rim of the endpiece 22; the tube extends through the endpiece 22 and is turned over and packed in bellows fashion, the rear end of the tube 21 being secured by bonding to the rear end of the endpiece 22.

As seen in FIG. 7, the front and rear ends of the tube 21 are bent over and respectively secured by bonding to the front and rear ends of the endpiece, but the tube itself is packed in bellows fashion inside the endpiece itself.

In the embodiment shown in FIG. 8, the front and the rear ends of the tube are again bent over and respectively secured by bonding to the front and rear ends of the endpiece, but the tube is coiled into a compact form in the endpiece itself.

The probe cartridges just described can be provided on the nose end thereof, i.e., the end to be inserted into the distributor body with a removable cap which is maintained in position when the probe is extended by the introduction of fluid under pressure. In this way, it is ensured that the extension or developing of the probe takes place only in one direction, i.e., away from the nose. Then, when it is desired to introduce the extended probe into a cavity, the cap is removed and by the insertion of an instrument into the central core of the probe, the probe advances by extroversion from the nose.

Reference will now be made to FIGS. 9 and 10 of the drawings which illustrate a probe dispenser unit for use with a coiled retractable probe. As seen in the drawings, the unit comprises a rectangular box 51, which has an open base designed to be sealed by a rectangular cover member 52 constituted by a base plate 53 and an upwardly projecting rectangular base 54 adapted to extend into the box, the upper surface of this rectangular base 54 being provided with a sealing surface 55 adapted to press sealingly against corresponding shoulders formed in the side walls of the box. The lower surface of the base plate 53 is provided with two cavities 56 for a purpose to be described below. The cover member 52 is adapted to be locked to the box 51 by a channel-shaped locking member 57, whose vertical limbs 53 terminate in inwardly directed flanges 59, which form an acute angle with the vertical limbs 58. Corresponding slots 60 are formed in the transverse walls of the box 51 extending along the length of these walls, and the locking member is adapted to be slid into locking position with its flanges 59 riding in these slots 60. When the locking member 57 is in the required position, it can be securely locked by means of a pair of locking bolts 61 extending through the base of the locking member 57 into the cavities 56 in the closing member referred to above. When these bolts are tightened, the cover member is pressed home thereby sealing the base of the box. A withdrawable square sectional shaft 63 extends through the box and is journalled, at one end thereof, on conical bearings 64 mounted in the box and extends at the other end thereof into a suitable sealing box 65 from when it is coupled to a turning handle 66. An upper side wall of the box is provided with an outlet aperture 67 in which can be fitted probe adapters (such as those previously described with reference to FIG. 3 and as shown in FIGS. 3a and 3b) of differing diameters. On the probe adapter can be fitted an auxiliary inlet adapter 69, which can be normally sealed with a screw 70, which can also accommodate means for introducing an auxiliary fluid. Alternatively, the auxiliary inlet adapter 69 can be coupled to manually operated means such as a pressure balloon by means of which intermittent pressure can be achieved.

The probe to be dispensed is in the form of a long, flexible tube (not shown), which is wound to a reel 71 adapted to be mounted on the retractable shaft. In order to mount the reel 71 in position, the box 51 is opened by removing the locking member 51 and the cover member 52; the shaft 63 is retracted and the reel 71 is mounted in position after which the shaft 63 is pressed through the box 51 so that the reel 71 is rotatably mounted on the shaft 63. The box 51 is then closed as described above; the end of the probe is drawn off the reel through the outlet aperture 67 and is turned back and fixed on the probe adapter; the inlet and outlet ports of the box 51 are respectively coupled to a source of fluid pressure and to a sink or the outside atmosphere. The inlet port and outlet port are then opened whereupon the dispensing box becomes filled with the filling fluid, and all air is expelled. After the air is expelled the outlet port is sealed and the continued flow of fluid into the box results in the dispensing of the probe through the outlet aperture and the extroversion thereof. When it is desired to retract the probe, the inlet port is closed, and the outlet port is opened, and the probe is retracted by winding the handle, thereby causing the retraction of the probe and the expulsion of the fluid.

FIG. 11 shows a form of probe cartridge which can be readily introduced into a probe dispenser substantially as described above. As before, the cartridge consists of a reel 72 upon which is wound the flexible tube 73. Articulated to the reel 72 and freely rotatable with respect to the reel 72 about the axis thereof is a connecting member 74, which consists basically of a tube having curved underportion allowing it to slide rotatably with respect to the reel 72. The end of the flexible tube 73 passes through the connecting member and is turned back on itself and secured to the mouth of the connecting member 74. The connecting member 74 is provided with a nose 75, which merges via a flanged shoulder 76 with the rest of the member and is provided with a locating aperture 77 and an inlet aperture 78.

In operation, the cartridge is inserted into a dispenser box as shown in FIG. 12, and the cover member of the box, when pressed into position by the bolts, causes the nose of the connecting member 74 to be pressed through the outlet aperture, the shoulders 76 of the connecting member 74 bearing via gaskets 79 on corresponding shoulders 80 adjoining the outlet aperture. In this way, the cartridge is firmly sealed in position whereupon the square-sectioned shaft is passed through the corresponding aperture formed in the reel. The locating screw 81 in the box is tightened, the end of it projecting through the locating aperture 77, whilst the inlet 82 is aligned with the inlet aperture 78 of the cartridge. As seen, the dispensing box is provided with inlet and outlet ports 82 and 84. In operation, as before, when it is desired to dispense the probe, both ports 82 and 84 are opened, the inlet ports having been connected to a sink. When the box is full of fluid, the outlet port is closed, and the continued flow of fluid into the dispensing box under pressure causes the dispensing of the probe. Retraction of the probe can then be effected by means of rotating the handle as a result of which the fluid is expelled from the probe in the box via the outlet duct.

As seen in FIG. 13 of the drawings, the projecting nose 75 of the cartridge can be suitably modified so as to render it suitable for use with a fluid distributor device as described with reference to FIGS. 6 and 7. In this event, the modified nose of the cartridge is coupled to a fluid distributor device whilst the cartridge is inserted and mounted in a dispenser box which, in this case of course, has no inlet or outlet ports, the fluid flowing into and out of the probe via the holes in the nose of the cartridge.

Alternatively, the probe adapter of the probe dispenser just described can be suitably modified so as to render it suitable for use with the fluid distributor device described with reference to FIGS. 4 and 5 of the drawings. In this case, the dispenser box is without inlet and outlet ports and without the cover member and the locking member therefore, and the probe reel is fixedly mounted on the shaft.

We claim:

1. In a medical-probe system comprising, in combination:
   a probe holder having a sleeve open at least at one end;
   a probe cartridge sealingly received in and removable from said sleeve and including a rigid casing open in the direction of said one end, and an elongated compacted tube of flexible material anchored at its ends to said casing and forming an annular chamber therewith pressurizable with a fluid to extend said tube through said open end of said sleeve while extroverting said tube;
   means for removably securing said casing in said sleeve; and
   means for supplying a fluid under pressure to within said sleeve, said casing being formed with at least one port opening within the sleeve communicating with said chamber for admitting fluid under pressure in said sleeve into said chamber to extend said tube.

2. The combination defined in claim 1, further comprising a fluid-distribution body constituting said sleeve and provided with inlet and outlet ducts adapted to communicate with said chamber, and means for introducing fluid to and removing said fluid from said inlet and outlet ducts, respectively.

3. The combination defined in claim 2, further comprising sealing means along the inner wall of said sleeve engageable with the outer wall of said casing.

4. The combination defined in claim 2 wherein said casing is formed along its outer surface with a recess, said head being provided with a spring loaded inwardly biased pin receivable in said recess for positioning said cartridge in said head.

5. The combination defined in claim 2 wherein said port is one of a multiplicity of circumferentially spaced apertures formed in said casing.

6. The combination defined in claim 5 wherein said casing is formed with a plurality of bands of circumferentially spaced apertures adapted to communicate with said inlet and outlet ducts.

7. The combination defined in claim 5 wherein said tube is at least partly compacted with a bellows-like configuration.

8. The combination defined in claim 5 wherein said tube is coiled in said casing.

9. The combination defined in claim 5 wherein said end of said casing is formed with a removable cap.

10. In a medical-probe system comprising, in combination:
    a probe holder having an open-ended sleeve;
    a probe cartridge sealingly received in and removable from said sleeve and including a rigid casing open in the direction of one end, and an elongated compacted tube of flexible material anchored at its ends to said casing and forming an annular chamber therewith pressurizable with a fluid to extend said tube through said one open end of said sleeve while extroverting said tube;
    means for removably securing said casing in said sleeve; and
    means for supplying a fluid under pressure to the interior of said sleeve, said casing being formed with at least one port opening within the sleeve communicating with said chamber and with said sleeve interior for admitting fluid under pressure in said sleeve into said chamber to extend said tube.

11. The combination defined in claim 10, further comprising a fluid-distribution body constituting said sleeve and provided with inlet and outlet ducts adapted to communicate with said chamber, and means for introducing fluid to and removing said fluid from said inlet and outlet ducts, respectively.